May 12, 1925.  
C. P. NELLIS  
1,537,258  
STEERING WHEEL  
Filed Dec. 24, 1923.  
2 Sheets-Sheet 1

Inventor.  
C. P. Nellis  
By Spencer, Sewall, & Hardman  
his Attorneys.

May 12, 1925.  
C. P. NELLIS  
1,537,258  
STEERING WHEEL  
Filed Dec. 24, 1923   2 Sheets-Sheet 2

Inventor.  
C. P. Nellis  
By Spencer, Sewall, & Hardman  
his Attorneys.

Patented May 12, 1925.

1,537,258

UNITED STATES PATENT OFFICE.

CHARLES P. NELLIS, OF DAYTON, OHIO, ASSIGNOR TO THE INLAND MANUFACTURING COMPANY, OF DAYTON, OHIO, A CORPORATION OF DELAWARE.

STEERING WHEEL.

Application filed December 24, 1923. Serial No. 682,370.

*To all whom it may concern:*

Be it known that I, CHARLES P. NELLIS, a citizen of the United States of America, residing at Dayton, county of Montgomery, and State of Ohio, have invented certain new and useful Improvements in Steering Wheels, of which the following is a full, clear, and exact description.

This invention relates to handwheels especially such as those ordinarily used at steering wheels on automotive vehicles.

An object of this invention is to provide a handwheel which is economical to manufacture and one which is strong and of good appearance.

A more specific object is to provide such a handwheel having a wooden spider comprising separate spokes of relatively narrow width and a separate unitary wood hub portion which forms the relatively wide central portion.

Another object is to provide such a connection between the separate spokes and the hub portion that the exposed joint between the ends of the spokes and hub portion will lie near the center of the wheel where it may be easily covered by the metal hub or cover cap ordinarily placed over the central portion of the wheel.

Another object is to provide an improved form of scarf joint for securing the wood segments of the rim together.

Further objects and advantages of the present invention will be apparent from the following description, reference being had to the accompanying drawings, wherein a preferred form of embodiment of the present invention is clearly shown.

In the drawings.

In the drawings similar reference characters refer to similar parts throughout the several views.

Figure 1:
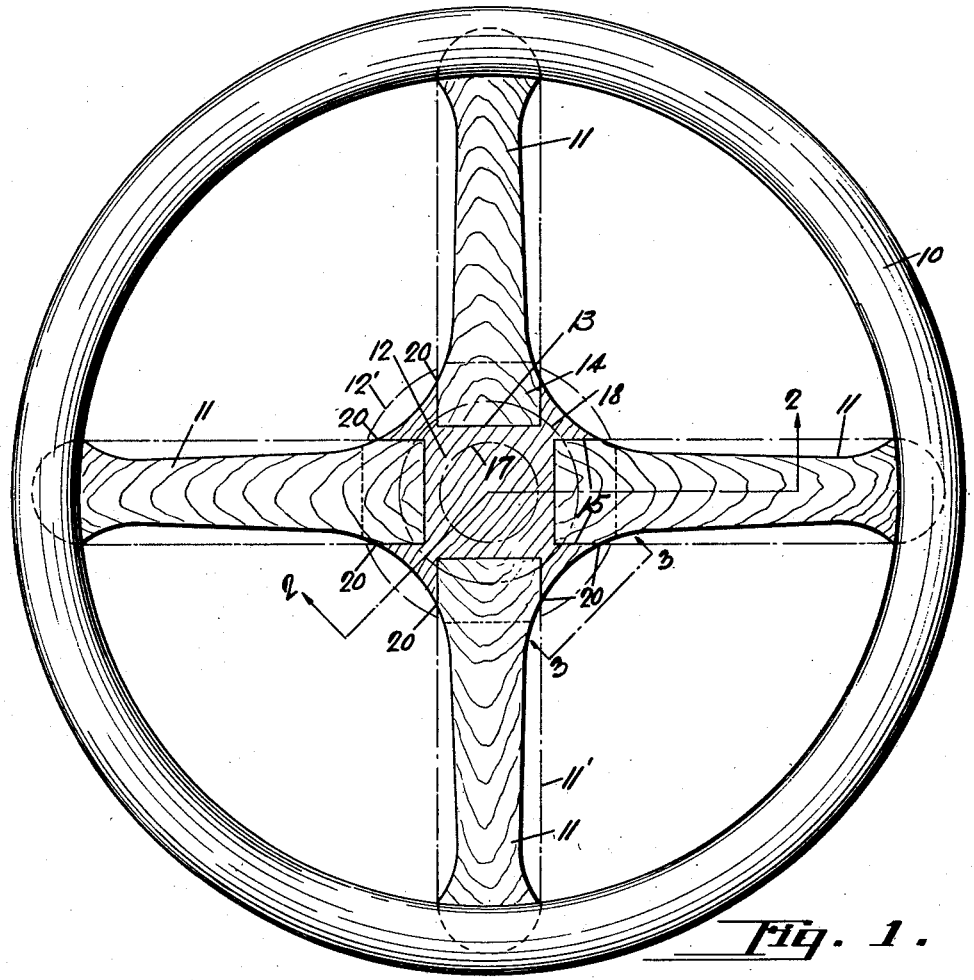
Fig. 1 is a plan view of a steering wheel built according to this invention and shows in dot and dash lines the original size of stock necessary from which to form the spokes and hub portion.
Figure 2:
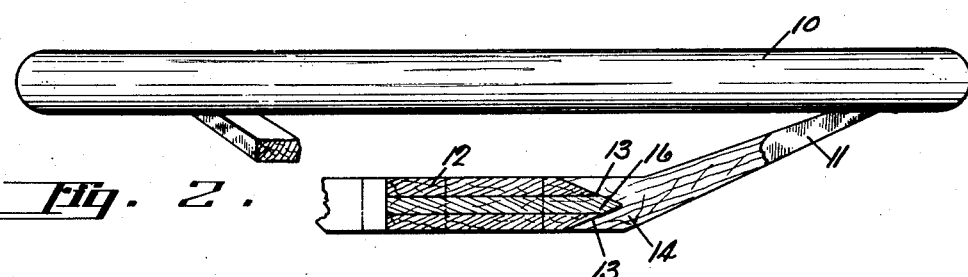
Fig. 2 is a section along line 2—2 of Fig. 1.
Figure 3:
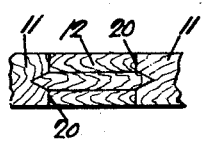
Fig. 3 is an elevation along the line 3—3 of Fig. 1.

Numeral 10 designates the wheel rim shown in Figs. 1 and 11 the wood spokes which are rigidly secured to the rim 10 at their outer ends in any suitable manner well known in the art. The central hub portion 12 is preferably made up of a plurality of layers of wood, the grains of adjacent layers being crossed to give strength. Substantially radial recesses 13 are cut in the hub portion 12 to receive the inner ends 14 of the spokes 11. These recesses 13 are cut out with parallel lateral side walls 15 and a tapered projecting tongue 16 extending radially outward as clearly shown in Figs. 1 and 2. The inner ends 14 of the spokes are correspondingly cut to accurately fit these recesses 13. Since said recesses 13 are open at both the upper and lower surfaces of the hub, the upper and lower surfaces of the spoke ends 14 will be exposed for the full length thereof. The hub 12 is provided with a central bore of the size shown by the dot and dash line 17 for the attachment thereto of a metal hub in the ordinary manner. The joints between the inner ends of the spokes and the hub portion 12 are close enough to the wheel center to be easily covered by the flange on the metal hub or by the housing cap cover usually affixed over said metal hub. When the periphery of this housing cap cover falls at the dot and dash line 18 in Fig. 1 it will be seen that only a portion of the short side joints will be exposed. This construction presents a much neater appearance than that wherein a joint transverse the spoke is exposed, which feature constitutes an important advantage of this invention.

In constructing this wheel the hub 12 is first made up of laminations glued together to form a unitary structure and having a plan outline of larger dimensions, such as shown by the dot and dash line 12' in Fig. 1. The recesses 13 are preferably cut by a rotating cutter of the full width of the recess and so guided to form the tapered tongues 16. The spokes 11 after having their inner ends 14 cut to snugly fit the recesses 13 are rigidly secured thereto by water-proof glue and held under pressure until the glue dries. The desired plan outline of the hub and the flare on the inner ends of the spokes may then be cut by suitable means, giving a neat fit between the spokes and hub at the points 20, which points by this means may be tapered to a feather edge without danger of splitting or breaking off. After the spider is thus formed the outer ends of the spokes are rigidly secured to recesses in the rim 10 in any suitable well known manner.

Figure 4:
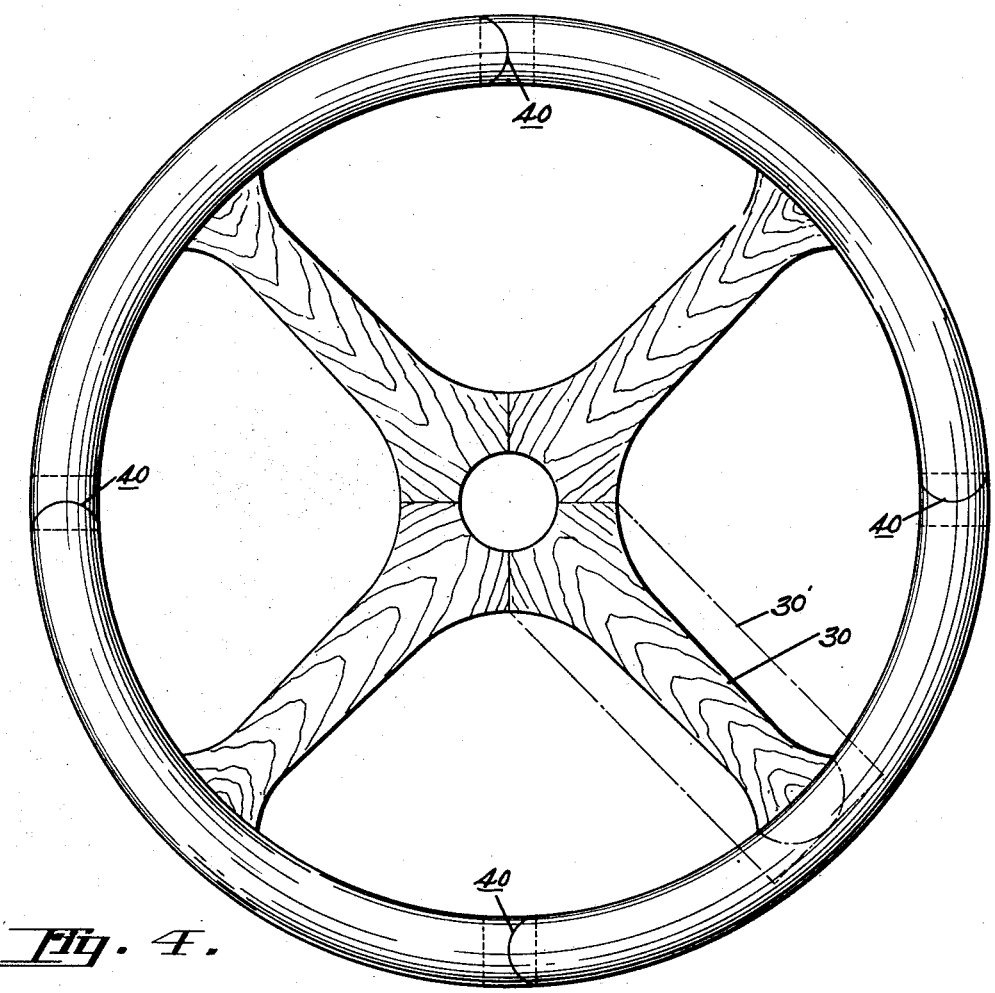
Fig. 4 is a plan view of a steering wheel having the ordinary wood spider construction but shows the improved rim scarf joint of this invention.

An important feature of this invention is the reduction of the size of the piece of wood stock required to form the wood spokes 11. Fig. 4 shows a steering wheel of the same size as that shown in Fig. 1 but having the ordinary wood spider construction. In this construction the size of stock necessary from which to form the spokes 30 is shown by the dot and dash line 30' and which is at least 50% larger than the size of stock shown by the dot and dash line 11' in Fig. 1.

Figure 5:
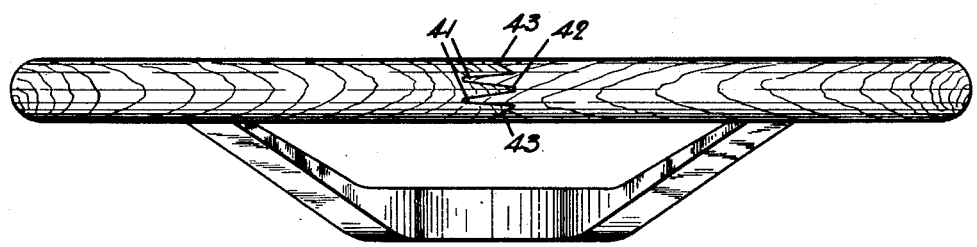
Fig. 5 is an elevation of the wheel of Fig. 4.

Figs. 4 and 5 also show the improved form of scarf joint 40 for rigidly joining the rim sections together. One segment is provided with two long tongues 41 having a very flat taper in order to provide a substantially flat grained surface on both sides of each of the tongues 41 to give a good gluing surface. The intermeshing adjacent segment is provided with a similar long flat tapered tongue 42 which intermeshes with the two tongues 41. The remaining two outside scarfs 43 of the joint 40 are shorter and are provided with a much steeper taper, as clearly shown in Fig. 5, in order to provide a more blunt feather edge at the surface of the rim. This taper is preferably about 30 degrees to the plane of the rim, which angle gives a sharp enough edge to make a good glued joint at the surface of the rim and yet a blunt enough edge to prevent splitting or breaking when the rim is shaped down to the oval section by a rotating cutter. The long overlapping slightly tapered tongues 41 and 42 in the central portion of the rim present a large area of substantially flat grain to which the glue will firmly adhere and thus greatly increase the strength of the joint.

While the form of embodiment of the present invention as herein disclosed, constitutes a preferred form, it is to be understood that other forms might be adopted, all coming within the scope of the claims which follow.

What is claimed is as follows:

1. A handwheel having a rim adapted to be grasped with the hands and a spider rigidly attached thereto, said spider comprising: a unitary central wood hub portion having recesses cut therein to receive the inner ends of the spokes, a plurality of separate spokes having inner ends inserted and rigidly secured in said recesses, the upper surface of the inner ends of said spokes overlapping and lying flush with the upper surface of said hub portion at the joint therebetween.

2. A handwheel having a rim adapted to be grasped with the hands and a spider rigidly attached thereto, said spider comprising: a unitary central wood hub portion having recesses cut therein to receive the inner ends of the spokes, a plurality of separate spokes having inner ends inserted and rigidly secured in said recesses, said inner ends stopping short of the central bore in said hub portion and having their upper surfaces exposed for the full length thereof.

3. A handwheel having a rim adapted to be grasped with the hands and a spider rigidly attached thereto, said spider comprising: a unitary central wood hub portion having recesses cut therein to receive the inner ends of the spokes, a plurality of separate spokes having inner ends inserted and rigidly secured in said recesses, the upper and lower surfaces of said inner ends overlapping and lying flush with the upper and lower surfaces of said hub portion at the points of connection.

4. A handwheel having a rim adapted to be grasped with the hands and a spider rigidly attached thereto, said spider comprising: a unitary central wood hub portion having recesses cut therein to receive the inner ends of the spokes, a plurality of separate spokes having inner ends inserted and rigidly secured in said recesses, said inner ends stopping short of the central bore in said hub portion and having their upper and lower surfaces exposed for the full length thereof.

5. A handwheel having a rim adapted to be grasped with the hands and a spider rigidly attached thereto, said spider comprising: a unitary central wood hub portion having recesses cut therein to receive the inner ends of the spokes, said recesses each having a horizontally disposed tongue projecting radially outwardly toward the hub periphery, a plurality of wood spokes having their inner ends shaped to fit said recesses and the tongue therein and rigidly secured to said hub portion.

6. A handwheel having a rim adapted to be grasped with the hands and a spider rigidly attached thereto, said spider comprising: a unitary central wood hub portion having recesses cut therein to receive the inner ends of the spokes, said recesses each having a horizontally disposed tongue projecting radially outwardly toward the hub periphery, a plurality of wood spokes having their inner ends shaped to fit said recesses and the tongue therein and rigidly secured to said hub portion, the upper surfaces of the inserted ends of said spokes lying flush with the upper surface of said hub portion.

7. A handwheel having a rim adapted to be grasped with the hands and a spider rigidly attached thereto, said spider comprising: a unitary central wood hub portion having recesses cut therein to receive the inner ends of the spokes, said recesses each having a horizontally disposed tongue projecting radially outwardly toward the hub periphery, a plurality of wood spokes having their inner ends shaped to fit said recesses and the tongues therein and rigidly secured to said hub portion, the upper and lower surfaces of the inserted ends of said spokes lying flush with the upper and lower surfaces of said hub portion.

8. A handwheel having a rim adapted to be grasped with the hands and a spider rigidly attached thereto, said spider comprising: a unitary central wood hub portion having recesses cut therein to receive the inner ends of the spokes, said recesses each having a horizontally disposed outwardly tapering tongue projecting radially outwardly toward the hub periphery, a plurality of wood spokes having their inner ends shaped to fit said recesses and the tongues therein and rigidly secured to said hub portion.

9. A handwheel having a rim adapted to be grasped with the hands and a spider rigidly attached thereto, said spider comprising: a unitary central wood hub portion having recesses cut therein to receive the inner ends of the spokes, said recesses each having a horizontally disposed outwardly tapering tongue projecting radially outwardly toward the hub periphery, a plurality of wood spokes having their inner ends shaped to fit said recesses and the tongues therein and rigidly secured to said hub portion, the upper surfaces of the inserted ends of said spokes lying flush with the upper surface of said hub portion.

10. A handwheel having a rim adapted to be grasped with the hands and a spider rigidly attached thereto, said spider comprising: a unitary central wood hub portion having recesses cut therein to receive the inner ends of the spokes, said recesses each having a horizontally disposed outwardly tapering tongue projecting radially outwardly toward the hub periphery, a plurality of wood spokes having their inner ends shaped to fit said recesses and the tongues therein and rigidly secured to said hub portion, the upper and lower surfaces of the inserted ends of said spokes lying flush with the upper and lower surfaces of said hub portion.

11. A handwheel having a rim adapted to be grasped with the hands and composed of a plurality of wood segments rigidly joined together by means of a glued scarf joint, said scarf joint having relatively long teeth of slight taper at only the central portion of the rim cross section in order to provide a large substantially flat grained gluing surface, and relatively blunt teeth at the upper and lower portions of the rim cross section in order to provide relatively blunt feather edges at the upper and lower surfaces of the rim.

12. A handwheel having a rim adapted to be grasped with the hands and composed of a plurality of wood segments rigidly joined together by means of a glued scarf joint, said scarf joint having relatively long teeth of slight taper at only the central portion of the rim cross section in order to provide a large substantially flat grained gluing surface, and relatively blunt teeth at the upper portion of the rim cross section in order to provide a relatively blunt feather edge at the upper exposed surface of the rim.

13. A handwheel having a rim adapted to be grasped with the hands and composed of a plurality of wood segments rigidly joined together by means of a glued scarf joint, said scarf joint having relatively long teeth of slight taper at only the central portion of the rim cross section in order to provide a large substantially flat grained gluing surface.

In testimony whereof I hereto affix my signature.

CHARLES P. NELLIS.